Feb. 26, 1963     E. M. KELLY     3,078,999
SLUDGE DIGESTER
Filed June 18, 1959     4 Sheets-Sheet 1
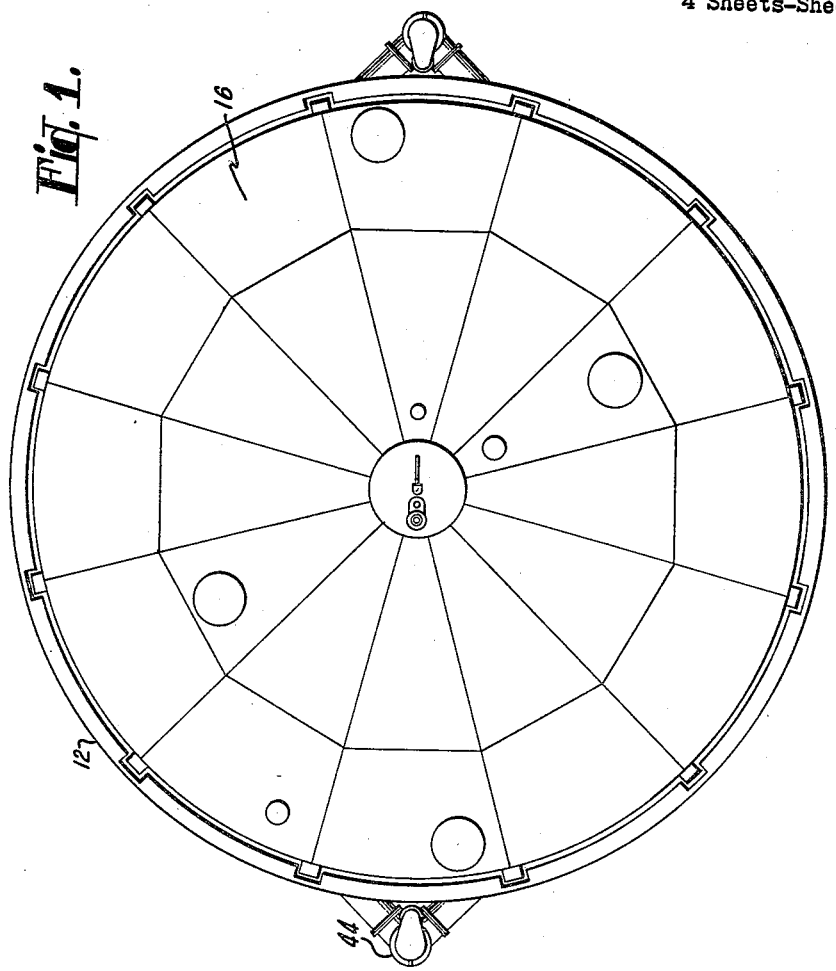
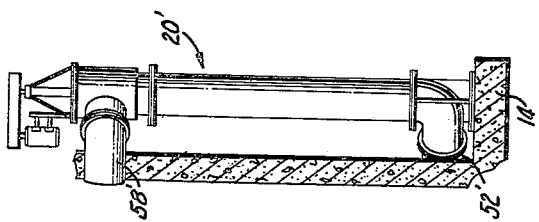
INVENTOR.
EARL M. KELLY
BY Christie, Parker & Hale
ATTORNEYS

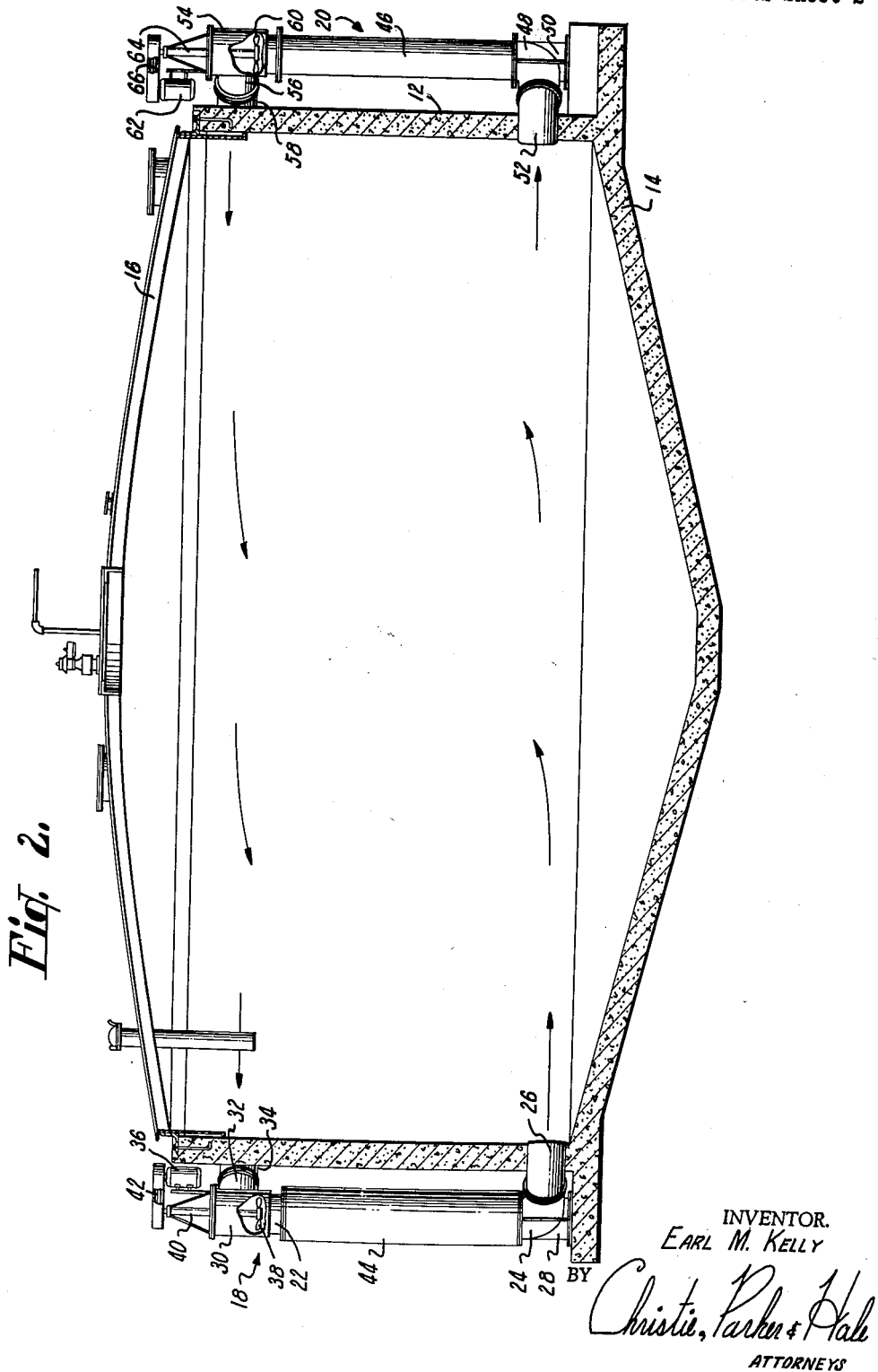

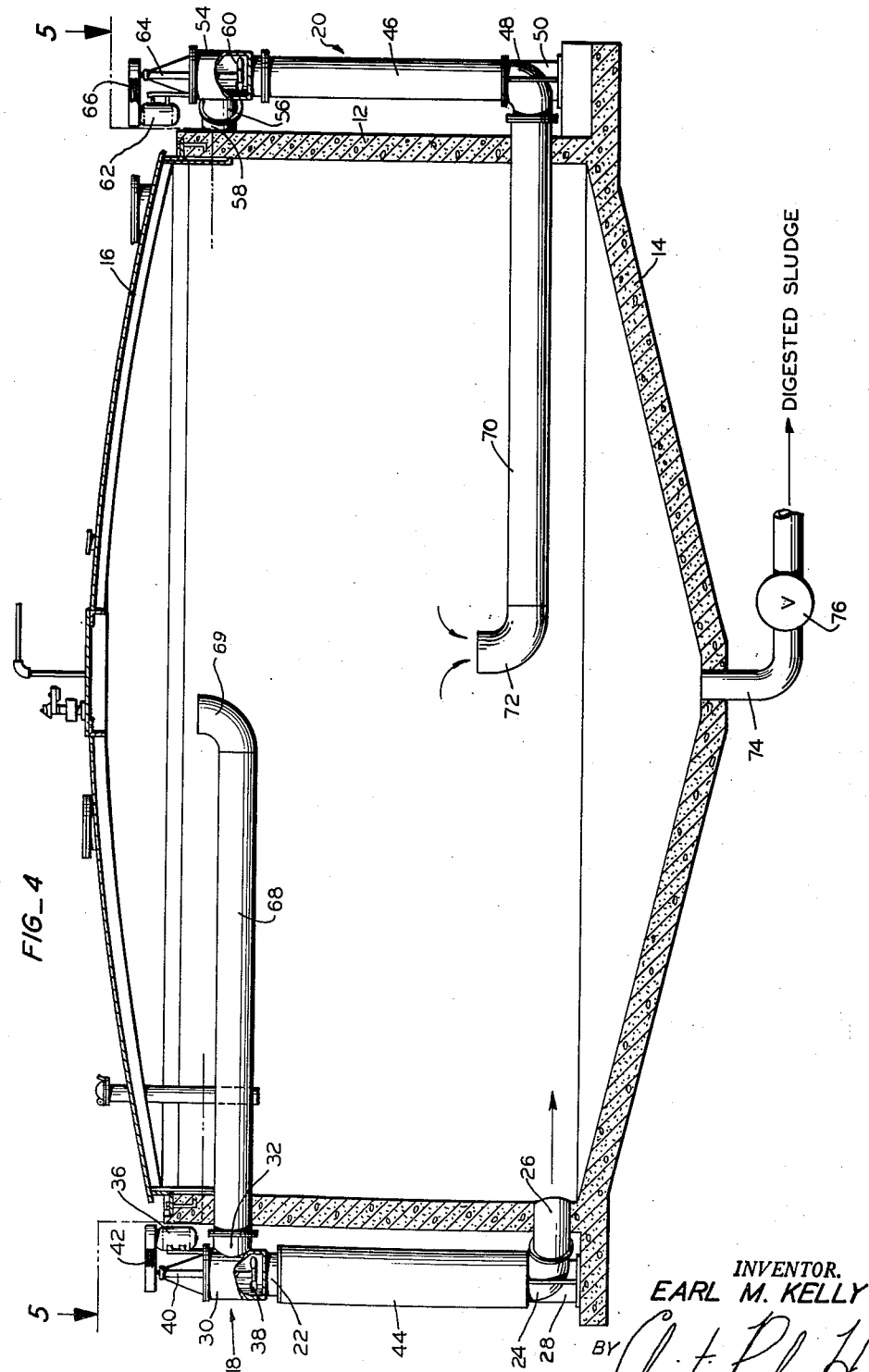

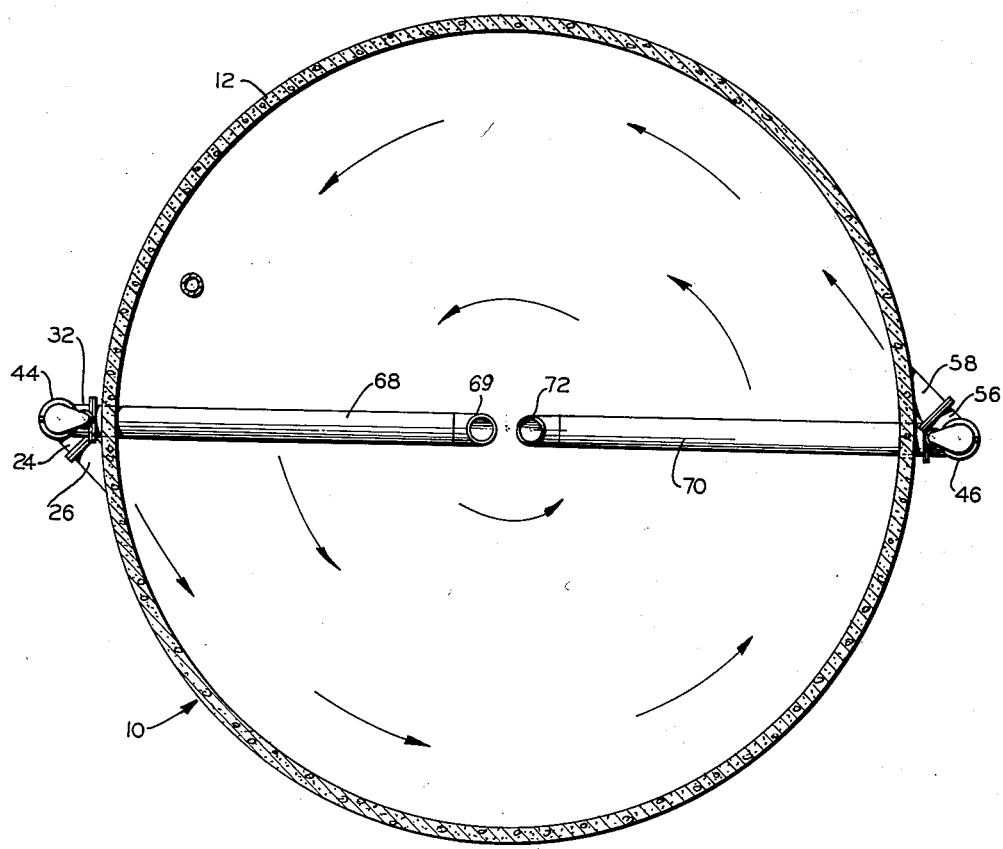

United States Patent Office 3,078,999
Patented Feb. 26, 1963

3,078,999
SLUDGE DIGESTER
Earl M. Kelly, 315 Pinehill Road, Hillsborough,
Burlingame, Calif.
Filed June 18, 1959, Ser. No. 821,318
2 Claims. (Cl. 210—194)

This invention, which is a continuation-in-part of my copending application Ser. No. 777,462, filed December 1, 1958, and now abandoned, relates to anaerobic digestion of sewage, and more particularly, is concerned with a digestion tank having an improved mixing arrangement for increasing the sludge digestion process.

The use of mixers in sewage sludge digesters is well known. The purpose of such mixers is to reduce scum formation and to cause substantial mixing of the sewage to promote bacterial action. One arrangement heretofore proposed has been the use of vertical draft tubes located inside a digester tank, with enclosed mixing propellers which act as pumps, the top of the draft tube being near the surface and the bottom of the draft tube discharging in a manner as to produce a tangential component of flow to the sewage liquid in the tank.

Such draft tube assemblies, because of their location in the central region of the tank, are cumbersome to install and properly support, and are not readily accessible for cleaning and repair without completely draining the tank. Furthermore, in such known arrangements in which the surface scum is drawn towards a vertical orifice, dissipation of the scum and thorough mixing is not always achieved where the scum is particularly thick.

The present invention is directed to an improved arrangement for effecting complete mixing and in particular which will displace and recirculate thick surface scum. This is accomplished in brief by providing one or more draft tubes which are located outside the digester tank. A pump is located in each of the draft tubes for moving liquid through the draft tube, each pump preferably having a capacity sufficient to pump a complete volume of the tank in approximately one hour. Each draft tube has an inlet pipe and an outlet pipe opening through the side of the tank. One of the pipes opens in a region slightly below the surface of the sewage but in the normal region of surface scum, and the other below the scum region in a lower portion of the tank. Preferably, at least one of the pipes opens tangentially into the tank to impart a swirling motion to fluid in the tank.

The preferred form of the invention includes a second draft tube with a pump and inlet and outlet pipes, at least one of which is directed at an angle to the radius of the tank so as to impart a tangential component of movement to the liquid in the same direction as the pipe connected to the other draft tube. The pumps in the external draft tubes are reversible so one can remove liquid from the bottom of the tank and discharge it at the top, while the other removes liquid from the top and discharges it at the bottom, or in an alternative arrangement the pump in the second draft tube may be operated in the same direction, so that both draft tubes draw off scum from the top.

In either arrangement, thorough zones of mixing are set up in the upper and lower portions of the tank which create complete internal circulation of the sewage content. In addition to improved circulation, this arrangement has the advantage that the external draft tubes can be cleaned if necessary without lowering the sewage level in the tank, and the draft tubes are more easily mounted.

Other advantages will become more apparent from the following detailed description, wherein:

FIG. 1 is a plan view of the sludge digester;

FIG. 2 is a vertical sectional view of the apparatus shown in FIG. 1;

FIG. 3 is a partial sectional view showing an alternative arrangement;

FIG. 4 is a sectional view of the presently preferred embodiment of the invention; and FIG. 5 is a view taken of line 5—5 of FIG. 4.

Considering the embodiment of the invention as illustrated in the drawings, the numeral 10 indicates a digester tank which is preferably cylindrical in form and may be as much as 100 feet in diameter. The tank 10 includes a cylindrical sidewall 12 and a conically shaped bottom wall 14 which slopes toward the center of the tank. The construction of the tank is conventional in form and may be made of reinforced concrete. A steel dome cover 16 extends over the top of the tank and is bolted or otherwise secured in position to form a completely enclosed digester tank.

In accordance with one embodiment of the present invention, one or more recirculator assemblies are provided, two of which are shown and indicated at 18 and 20 respectively at diametrically opposite positions relative to the tank 10. The recirculator assembly 18 includes a vertical draft tube 22, the lower end of which is attached to a 90° elbow section 24 to which is secured an outlet pipe section 26. The outlet pipe section extends through the sidewall 12 of the tank adjacent the bottom, and as best shown in FIG. 1, enters the tank at a substantial angle to the radial plane passing through the center line of the draft tube 22 and the center of the tank. The weight of the recirculator assembly is taken by a bracket 28 which is welded to the elbow 24 and rests on a concrete base formed integrally with the tank wall.

The upper end of the recirculator assembly 18 includes a pump section comprising a housing 30 secured to the upper end of the draft tube 22. The housing includes a T-pipe section 32 to which is secured an inlet pipe 34. The inlet pipe extends through the sidewall 12 of the tank 10, and, as best seen in FIG. 1, the inlet pipe extends at a substantial angle to the radial plane passing through the central axis of the draft tube 22 and the tank 10. It will be noted that the inlet pipe 34 and the outlet pipe 26 of the recirculator assembly extend into the tank in substantially opposite directions.

A reversible pump motor 36 is arranged to drive a suitable impeller 38 within the pump housing 30 through a vertical shaft 40 and a belt drive 42. It will be appreciated that the impeller 38 and the associated drive can be readily removed from the housing 30 as an assembly. Thus cleaning of the recirculator assembly is greatly facilitated by the external location thereof.

The external positioning of the draft tube 22 permits a heat exchanger jacket 44 to be positioned around the draft tube 22 through which hot water may be circulated to heat the sewage as it circulates through the recirculators. Application of heat, particularly under frigid ambient conditions, greatly enhances the bacterial action, speeding up the digestion process.

The recirculator assembly 20 is similarly constructed with a vertical draft tube 46, the lower end of which is secured to a 90° elbow having a support bracket 50 resting on a cement base. An inlet pipe section 52 extends through the sidewall 12 of the tank and is secured to the elbow 48. It extends at an angle to the radial plane defined by the central axis of the draft tube 46 and the center axis of the tank.

A pump housing 54 is secured to the upper end of the draft tube 46 and has a T-pipe section 56 to which is secured an outlet pipe 58. The outlet pipe extends through the sidewall 12 of the tank 10 at an angle to the radial plane passing through the central axis of the draft tube 46 and the center axis of the tank. The outlet pipe section 58 opens in substantially the opposite direction from the inlet pipe 52. The pump assembly includes an impeller 60 driven from a pump motor 62 through a shaft 64 and belt drive 66.

As best seen in FIG. 2, the inlet pipe 34 of the recirculator assembly 18 is located well below the surface of the liquid but preferably within the region of the scum layer, which normally occurs at the top of the tank to a depth of several feet in the absence of mixing. The outlet pipe of the recirculator assembly 20 is located substantially at the surface of the liquid, while the intake pipe 52 is located further above the bottom of the tank then the outlet pipe 26 of the recirculator assembly 18. The relative vertical location of the inlet and outlet of the recirculators is of significance in achieving the desired mixing as will hereinafter be made apparent.

A horizontal circulation in a counterclockwise rotation is achieved by the flow of liquid through the draft tubes of the recirculator. The tangential arrangement of the outlet pipes 26 and 58 of the recirculator assemblies 18 and 20 is such as to impart a tangential component of force in the discharged fluid. A similar effect is produced by the suction force at the inlet pipe 34 and 52 respectively of the recirculators 18 and 20. This arrangement provides a substantially homogeneous mixing of the solid matter throughout the volume of the tank. The recirculator 18 draws off scum from near the top of the tank and forces it to the bottom. The lighter components of the solid matter then drift upward through the central region of the tank. At the same time, the heavy sludge which accumulates at the bottom of the tank is drawn off by the recirculator 20 and discharged at the top of the tank. The heavier particles then slowly settle through the central portion of the tank. Thus there is a continual inversion, by which mixing is effected, in which the heavy sludge is drawn off the bottom and the lighter scum is drawn off the top. It will further be appreciated that the discharge of liquid and heavy sludge at the top of the scum layer has the effect of breaking up the scum material causing the heavier parts of it to settle.

An alternative arrangement is shown in FIG. 3. This figure shows a modification of the right hand recirculator 20 of FIGS. 1 and 2, all the numbers being primed in FIG. 3 to distinguish them from the numbers of corresponding parts in FIGS. 1 and 2. The impeller 60' is driven in the opposite direction so as to produce a downward flow. This makes the pipe 52' an outlet and the pipe 58' an inlet to the recirculator 20'. The directions of the pipes are reversed in the modification of FIG. 3 so that the same tangential component of flow is still produced by both recirculators.

In this manner, in both the arrangement of FIGS. 1 and 2 and the arrangement according to the modification of FIG. 3, a lower zone of tangential flow causing circulation of the material in the tank bottom with maximum velocity occurring near the tank periphery is created. A similar circulation zone is produced at the top surface of the tank. Because both zones are caused to circulate in the same direction, a similar circulation is imparted to the liquid in the central horizontal zone of the tank so as to produce thorough mixing.

The invention according to the modification of FIG. 3 has the advantage that stronger vertical currents are established, since all discharge is at the bottom and all suction is at the top of the liquid.

A further advantage of the two recirculators arranged in either of the modifications described above is that build-up of solid matter on the walls of the tank is avoided. It has been found that where grit is present in the sludge, and in many cases even in the absence of heavy granular grit, there is a build-up of solid matter on the sidewalls of the tank which is widest at the surface. Heretofore this build-up has required the tank to be partially drained and the material dislodged by physically knocking it off the sidewall. With the present flow pattern produced by the recirculator arrangement of the present invention, this build-up is prevented by the horizontal circulation in the scum zone.

Furthermore, heavy grit due to the horizontal circulation of the bottom zone tends to collect in the center of the tank in the region of minimum velocity. This concentration of grit, which grit otherwise presents a serious problem in the digester, makes it easy to remove.

While the preferred embodiment of the invention has been described as including two circulators located at diametrically opposite positions of the tank, it is possible for operation of smaller tanks of 20 to 30 feet in diameter to operate with a single recirculator, preferably having a downward flow in the manner of the recirculator 18 described above. The horizontal rotation in both the top and bottom zones within the tank is effected by a single recirculator in a small tank and pulling off of the scum layer is also accomplished, although not as efficiently as in the double recirculator arrangement described. It will also be appreciated from the above description that where very large tanks are used, it may be desirable to use more than two circulators to provide sufficient circulation to effect the desired mixing within the tank.

The embodiments described above are particularly suitable in systems employing multiple digesters, the digester described being used as the primary or first stage in the multistage system. The reason is that the homogeneous mixing effected by this unit is particularly desired in the primary stage where the initial digestion takes place and the amount of digested solid material is relatively small. For later stages, in a multistage system or where a single stage digester is employed, it may be desired to locate the outlet pipe 26 of the recirculator 18 and the inlet pipe 52 of the recirculator 20 well off the bottom of the tank in the region of the central zone. In this manner the mixing currents are set up so that they do not interfere with the concentration of digested material at the bottom of the tank, making it easier to draw off the digested sludge in a thickened condition at the point of disposal which is at the lowest point in the tank.

While the recirculators in the foregoing embodiments are described as pumping in a particular direction, it will be understood that the pumps may be made reversible if desired, whereby a combination of upward and downward pumping in the draft tubes may be effected.

The presently preferred embodiment of the invention is shown in FIGS. 4 and 5 which is similar to the embodiment in FIGS. 1 and 2 except that the relatively short inlet pipe 34 of the recirculator 18 is replaced by a relatively long horizontal inlet pipe 68 which extends radially from the pipe section 32 to the center of the tank 10, where it terminates in an upwardly opening elbow 69 located in a region slightly below the surface of the sewage in the tank, but in the normal region of surface scum. The vertical operning of the elbow 69 aids in forming a vortex flow pattern in the upper central portion of the tank and facilitates the flow of the lighter scum into the pipe.

The apparatus of FIGS. 4 and 5 also differs from that shown in FIGS. 1 and 2 in that the relatively short inlet pipe 52 of the recirculator 20 is replaced by a relatively long horizontal pipe 70 which extends radially from the elbow 48 to the central portion of a lower part of the tank. The inner end of the inlet pipe 70 is connected to an elbow 72 which opens upwardly.

The apparatus of FIGS. 4 and 5 includes a digested sludge discharge line 74 opening out of the center of the bottom of the tank and including a valve 76 for controlling the removal of digested sludge from the tank. Except for the foregoing differences, the apparatus of FIGS. 4 and 5 is identical with that of FIGS. 1 and 2, and like elements are given corresponding reference numerals.

The apparatus of FIGS. 4 and 5 is preferably operated so that fluid is circulated in the tank in the direction indicated by the arrows. The pump impeller 38 in the recirculator 18 is driven in a direction to force liquid down draft tube 22 so that liquid is forced out of outlet pipe 26 tangentially into the tank, and so that scum is sucked into the open end of inlet pipe 68.

The impeller 60 in the recirculator 20 is driven to force liquid to flow upwardly in the draft tube 46 of recirculator 20 so that relatively heavy sludge is pulled into the open end of inlet pipe 70, and discharged tangentially into the top of tank through outlet pipe 58 at the upper end of recirculator 20.

The operation of the apparatus of FIGS. 4 and 5 in the manner just described insures a substantially homogeneous mixing of the solid matter throughout the volume of the tank. The recirculator 18 draws off scum from near the top of the tank and at the center of the tank and forces it into a spiral path along the tank bottom. The lighter components of the solid matter then drift upwardly in a spiral path through the tank. Simultaneously, a relatively heavy sludge which tends to accumulate at the bottom of the tank is picked up at the open end of the inlet pipe 70 and forced by the recirculator 20 into a spiral path around the top of the tank. The heavier particles then settle slowly in a spiral path toward the lighter scum which has been discharged in the lower portion of the tank. Thus, there is a forced continual inversion so that the discharge of liquid and heavy sludge at the top of the tank has the effect of breaking up the scum material, causing the heavier parts of it to settle.

The circulation pattern of liquid in the apparatus of FIGS. 4 and 5 does not interfere with the concentration of relatively heavy digested material at the bottom of the tank, making it easier to draw off the digested sludge in a thickened condition through the digested sludge removal line 74. Moreover, the inlet to pipe 70 is located well off the bottom of the tank in the central portion thereof to avoid picking up digested sludge.

Either one or both of the impellers of the apparatus of FIGS. 4 and 5 can be reversed from the previously indicated directions to obtain a variety of flow patterns to achieve the most effective treatment of the sewage. However, the advantage of the apparatus of FIGS. 4 and 5 is that the location of at least one of the pipes at the center portion of the tank avoids the possibility of a "dead zone" in which there would be little liquid circulation or mixing.

I claim:

1. A sewage digester comprising a tank normally filled with sewage to an operating level, a first draft tube disposed outside of the tank, a first discharge pipe connected at one end to one end of the first draft tube and having its other end directed tangentially into the periphery of the tank and in the vicinity of the operating level of the tank, a first inlet pipe having one end disposed in a central portion of the tank and above the tank bottom to leave a relatively quiet zone in the bottom of the tank to receive settled and thickened sludge, the other end of the first inlet pipe being connected to the other end of the first draft tube, a second draft tube disposed outside of the tank, a second discharge pipe connected at one end to one end of the second draft tube and having its other end directed tangentially into the periphery of the tank at level below where the first discharge pipe opens into the tank and above the quiescent zone, a second inlet pipe having one end disposed in a central portion of the tank in the vicinity of the operating level and having its other end connected to the other end of the second draft tube, and means for inducing the flow of liquid through the draft tubes.

2. Apparatus in accordance with claim 1 in which the first discharge pipe has its said other end directed tangentially into the tank in one direction, and the second discharge pipe has its said other end directed tangentially into the tank in the opposite direction.

References Cited in the file of this patent

UNITED STATES PATENTS

| 1,139,825 | Vandercook | May 18, 1915 |
| 1,880,773 | Buswell et al. | Oct. 4, 1932 |
| 1,902,078 | Jenks | Mar. 21, 1933 |
| 1,912,595 | Schlenz | June 6, 1933 |
| 2,023,295 | Thackwell | Dec. 3, 1935 |
| 2,509,695 | Parker | May 30, 1950 |
| 2,582,198 | Etheridge | Jan. 8, 1952 |
| 2,595,391 | Durdin | Sept. 8, 1952 |

FOREIGN PATENTS

| 445,697 | Great Britain | Apr. 14, 1936 |